United States Patent
Sachs

(10) Patent No.: US 7,616,195 B2
(45) Date of Patent: Nov. 10, 2009

(54) ONE DIMENSIONAL AND THREE DIMENSIONAL EXTENSIONS OF THE SLIDE PAD

(75) Inventor: Todd S. Sachs, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 584 days.

(21) Appl. No.: 11/051,107

(22) Filed: Feb. 4, 2005

(65) Prior Publication Data

US 2006/0176270 A1    Aug. 10, 2006

(51) Int. Cl.
*G06F 3/044* (2006.01)
(52) U.S. Cl. .............. 345/174; 345/156; 345/173; 178/18.01; 178/183.03; 178/18.06
(58) Field of Classification Search ............ 345/156, 345/173, 174, 184; 178/18.01, 18.03, 18.06
See application file for complete search history.

(56) References Cited

U.S. PATENT DOCUMENTS

| | | | | |
|---|---|---|---|---|
| 5,748,185 A | * | 5/1998 | Stephan et al. | 345/173 |
| 5,844,415 A | * | 12/1998 | Gershenfeld et al. | 324/663 |
| 5,856,822 A | * | 1/1999 | Du et al. | 345/73 |
| 6,359,616 B1 | * | 3/2002 | Ogura et al. | 345/173 |
| 6,891,382 B2 | * | 5/2005 | Post et al. | 324/663 |
| 2002/0190727 A1 | * | 12/2002 | Morimoto | 324/661 |

* cited by examiner

*Primary Examiner*—My-Chau T Tran

(57) ABSTRACT

In one embodiment of the invention, a method for providing three-dimensional motion inputs to a device includes measuring characteristics (e.g., capacitances) between sense electrodes and a reference electrode on a movable pad, determining three-dimensional displacements of the movable pad from the capacitances, determining the three-dimensional motion inputs from the three-dimensional displacements of the movable pad, and providing the three-dimensional motion inputs to the device.

In another embodiment of the invention, a pointing device mounted on a surface of a host device includes sense electrodes, a frame, a movable pad flexibly mounted in an opening of the frame. The movable pad includes a reference electrode opposite the sense electrodes. The opening limits the motion of the movable pad to a single axis on the surface and to an axis into the surface.

11 Claims, 4 Drawing Sheets

ONE DIMENSIONAL AND THREE DIMENSIONAL EXTENSIONS OF THE SLIDE PAD

DESCRIPTION OF RELATED ART

Various input devices are in use for manipulating icons such as cursors on screens of computers and various electronic devices. For example, computer mice and trackballs are popular as input devices for desktop computers.

For personal digital assistants (PDAs) and cellular telephones, touch sensitive pads, joystick controls, and push buttons are popular. However, each of these devices has drawbacks. For example, touch pads require a relatively large input area. In small devices such as cellular telephones, surface area is at a premium. Joystick controls have poor user feedback. This is because joystick controls typically do not move at all; rather, pressure sensors are used to detect user input. Push buttons allow movements only in discrete directions rather than movements in all directions.

SUMMARY

In one embodiment of the invention, a method for providing three-dimensional motion inputs to a device includes measuring characteristics (e.g., capacitances) between sense electrodes and a reference electrode on a movable pad, determining three-dimensional displacements of the movable pad from the capacitances, determining the three-dimensional motion inputs from the three-dimensional displacements of the movable pad, and providing the three-dimensional motion inputs to the device.

In another embodiment of the invention, a pointing device mounted on a surface of a host device includes sense electrodes, a frame, a movable pad flexibly mounted in an opening of the frame. The movable pad includes a reference electrode opposite the sense electrodes. The opening limits the motion of the movable pad to a single axis on the surface and to an axis into the surface.

BRIEF DESCRIPTION OF THE DRAWINGS

Use of the same reference numbers in different figures indicates similar or identical elements.

DETAILED DESCRIPTION

A new type of input device is disclosed in commonly assigned U.S. patent application Ser. No. 10/723,957, entitled "Compact Pointing Device," filed on Nov. 24, 2003. That input device includes a slide pad movably suspended over sense electrodes. Capacitances between the sense electrodes and a reference electrode in the slide pad are measured to determine the X, Y, and Z displacements of the slide pad. When the Z displacement of the slide pad is greater than a first threshold, the X and Y displacements are used to control the movement of a cursor. When the Z displacement is greater than a second threshold, it is interpreted as a select command (similar to clicking in a mouse).

Figure 1:
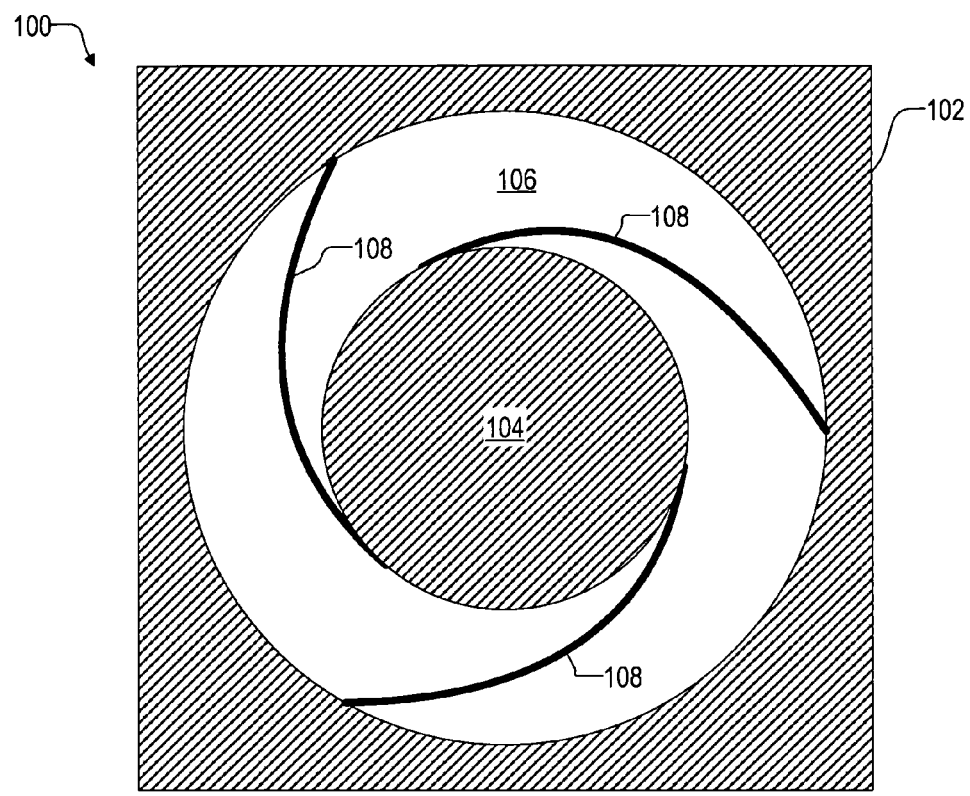
FIGS. 1 and 2 illustrate top views of a first slide pad device in embodiments of the invention.

FIG. 1 illustrates a top view of components in an optical slide pad device 100 in one embodiment of the invention. Device 100 is an input device for a host device 600 (FIG. 6), such as a cell phone, a PDA, or a digital camera. A user operates device 100 to interact with host 600, such as moving a cursor on a display of host 600.

Device 100 includes a frame 102 and a slide pad 104 (also referred to as a movable pad) flexibly mounted within an opening 106 in frame 102. In one embodiment, slide pad 104 and opening 106 are circular. In one embodiment, springs 108 attach slide pad 104 to frame 102. In one embodiment, springs 108 are spiral springs that attach in a tangential fashion to slide pad 104 and frame 102. Springs 108 return slide pad 104 to a center resting position within opening 106. In operation, a user places his or her finger on slide pad 104 to interact with host 600.

Figure 2:
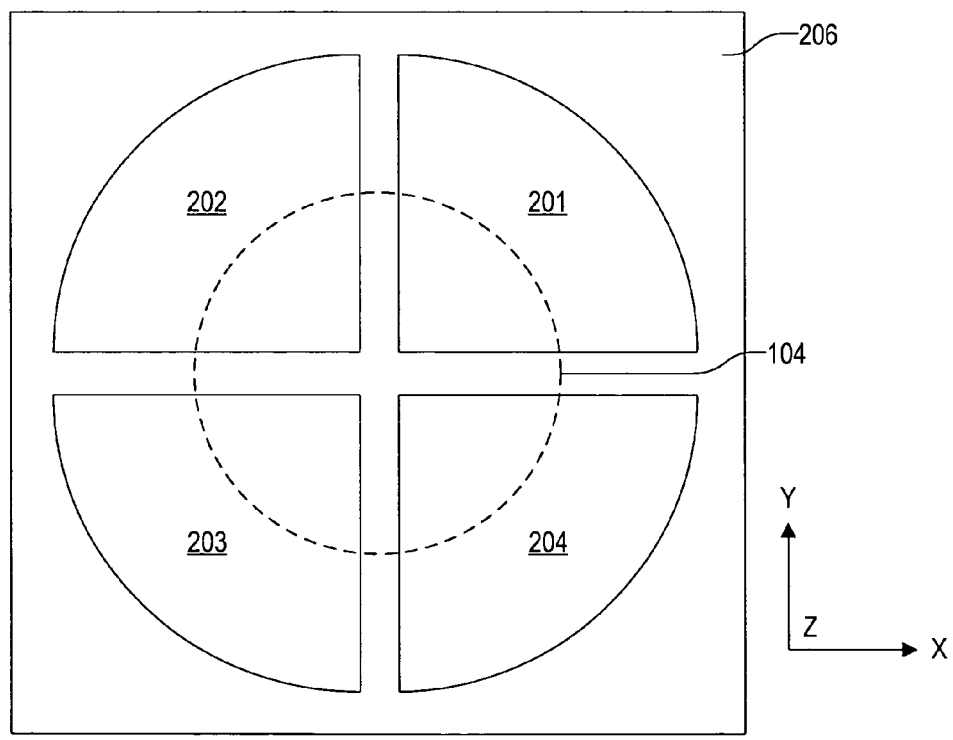
Figure 3:
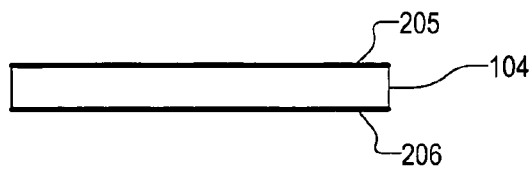
FIG. 3 illustrates a cross-sectional view of a slide pad in the first slide pad device in embodiments of the invention.

FIG. 2 illustrates a top view of components in device 100 located below slide pad 104 in one embodiment of the invention. These components include sense electrodes 201, 202, 203, and 204 on a printed circuit board 206. Slide pad 104 is shown in phantom over electrodes 201 to 204. FIG. 3 illustrates a cross-section of slide pad 104 in one embodiment of the invention. Slide pad 104 includes a top sense electrode 205 and a bottom reference electrode 206. Top sense electrode 205 is optional for some embodiments of the invention. Electrodes 201 to 206 include terminals connected to external circuitry to detect characteristics of the electrodes (e.g., capacitances between the electrodes). In one embodiment, springs 108 are used as conductive paths to sense electrode 205 and reference electrode 206.

Figure 4:
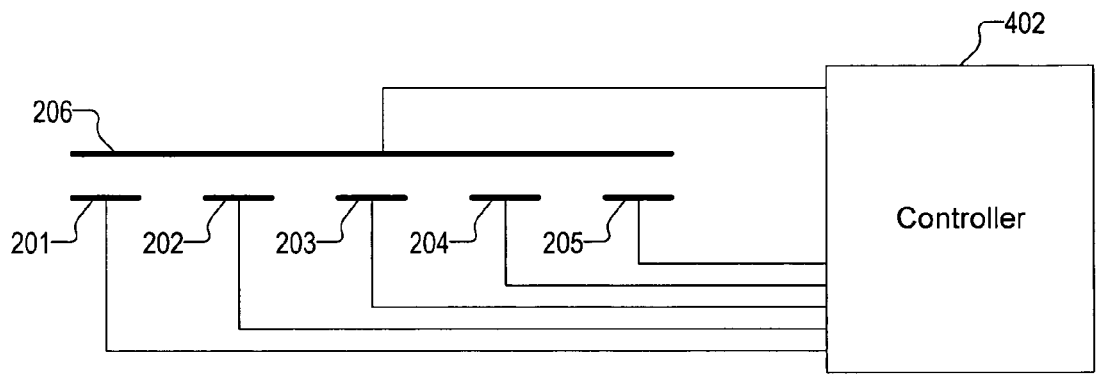
FIG. 4 illustrates a controller coupled to the sense electrodes in the first slide pad device in embodiments of the invention.

FIG. 4 illustrates a controller 402 coupled to electrodes 201 to 206 to sense the capacitances between the sense electrodes and the reference electrode. The capacitances can be correlated to the overlapped areas between slide pad 104 and electrodes 201 to 204, which in turn can be correlated to the displacements of slide pad 104 in the X and Y-axes. The capacitances can also be correlated to the distance between electrodes 205 and 206, or the distance between electrode 206 and electrodes 201 to 204, which in turn can be correlated to the displacement of slide pad 104 in the Z-axis. Note that the arrangement of electrodes 201 to 206 in FIG. 4 is not geometrically accurate and is shown to illustrate the operation of device 100.

In one embodiment, the displacements of the slide pad 104 in the X, Y, and Z-axes are used to provide three-dimensional motion inputs to host 600. Thus, device 100 is used like a three-dimensional joystick for host 600. Device 100 has many applications. The user may use device 100 to play a three-dimensional game so the user can control left/right, up/down, and in/out motion. The user may also use device 100 to navigate a GPS (global positioning system) map program so the user can pan right/left/, pan up/down, and zoom in/out of the map.

In one embodiment of the invention, the displacements of slide pad 104 in the X and Y-axes are determined using the following equations:

$$X \propto \frac{(C2+C3)-(C1+C4)}{(C1+C2+C3+C4)}, \quad (1)$$

$$Y \propto \frac{(C1+C2)-(C3+C4)}{(C1+C2+C3+C4)}, \quad (2)$$

where X is the displacement along the X-axis, Y is the displacement along the Y-axis, C1 is the capacitance between sense electrode 201 and reference electrode 206, C2 is the capacitance between sense electrode 202 and reference electrode 206, C3 is the capacitance between sense electrode 203 and reference electrode 206, and C4 is the capacitance between sense electrode 204 and reference electrode 206. Note that the denominator in equations (1) and (2) ensure the resulting displacements are independent of the gap between reference electrode 206 and sense electrodes 201 to 204.

In one embodiment of the invention, the displacement of slide pad 104 in the Z-axis is determined using the following equation:

$$Z \propto C5, \quad (3)$$

where Z is the displacement along the Z-axis and C5 is the capacitance between sense electrode 205 and reference electrode 206.

In another embodiment of the invention where sense electrode 205 is absent, the displacement of slide pad 104 in the Z-axis is determined using the following equation:

$$Z \propto C1+C2+C3+C4. \quad (4)$$

In one embodiment, controller 402 measures capacitances C1 to C5 individually and then uses the result to determine the displacements in the X, Y, and Z-axes. In another embodiment, controller 402 measures certain capacitances simultaneously. For example, the capacitance of (C2+C3)−(C1+C4) can be measured at reference electrode 206 by driving sense electrodes 202 and 203 high, and driving sense electrodes 201 and 204 low. Similarly, the capacitance of (C1+C2)−(C3+C4) can be measured at reference electrode 206 by driving sense electrodes 201 and 202 high, and driving sense electrodes 203 and 204 low. Similarly, the capacitance of C1+C2+C3+C4 can be measured at reference electrode 206 by driving sense electrodes 201 to 204 high.

In one embodiment, the electrical connection to reference electrode 206 is eliminated. In this embodiment, the capacitance between sense electrodes 201 and 202 is measured separately from the capacitance between sense electrodes 201 and 203, and so on. Thus, four measurements between adjacent sense electrodes provide information to solve for each of the four capacitances, and thereby determining the displacement of slide pad 104.

Figure 5:
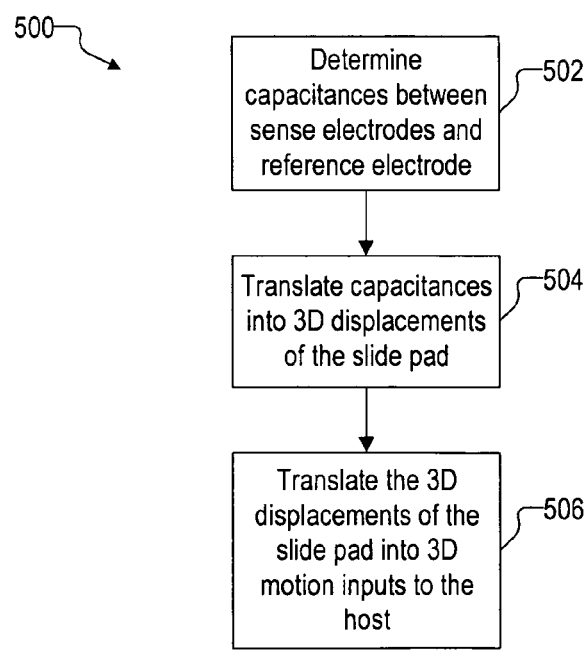
FIG. 5 illustrates a method for operating the first slide pad device in embodiments of the invention.

FIG. 5 is a flowchart 500 for controller 402 to determine the displacement of slide pad 104 in one embodiment of the invention.

In step 502, controller 402 determines the capacitances between the sense electrodes and the reference electrode necessary to determine the displacements of slide pad 104 in the X and Y-axes. Controller 402 may determine the capacitances using any of the schemes described above.

In step 504, controller 402 translates the measured capacitances into X, Y, and Z displacements using equation (1), (2), and (3)/(4).

In step 506, controller 402 translates the X, Y, and Z displacements into three-dimensional motion inputs. The X, Y, and Z displacements can have a one-to-one correspondence with the displacements of a cursor. Alternatively, the X, Y, and Z displacements can be scaled to generate the displacements of the cursor. Furthermore, the X, Y, and Z displacements can be translated into velocities for the cursor along the three axes. Alternatively, any combination of the above three schemes can be used to provide three-dimensional motion inputs to host 600.

In one embodiment, controller 402 starts to track the X and Y displacements when the Z displacement exceeds a first threshold. When the Z displacement exceeds a second threshold, controller 402 turns the Z displacement into a motion input. Controller 402 provides these motion inputs to host 600.

Figure 6:
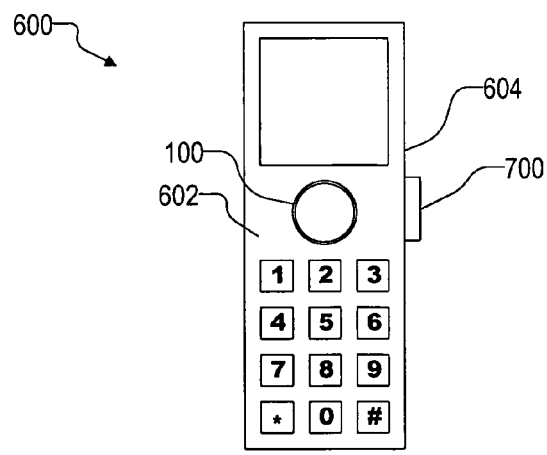
FIG. 6 illustrates the first slide pad device and a second slide pad device incorporated into a host device in embodiments of the invention.

FIG. 6 illustrates host device 600 in one embodiment of the invention. As can be seen, device 100 is located on a surface 602 of host 600. Device 100 provides two-dimensional control on surface 602 and one-dimensional control into surface 602.

In another embodiment of the invention, an optical slide pad device 700 is used in conjunction or in the place of device 100. Device 700 is mounted on a surface 604 of host 600 and provides only one-dimensional control along surface 604 and one-dimensional control into surface 604. For example, the user can use device 700 to scroll up or down and to select an option.

Figure 7:
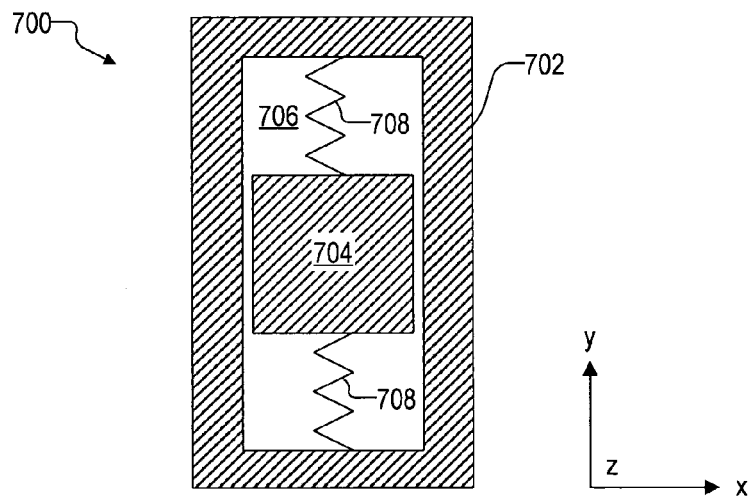
FIGS. 7 and 8 illustrate top views of a second slide pad device in embodiments of the invention.

FIG. 7 illustrates a top view of components of device 700 in one embodiment of the invention. Device 700 includes a frame 702 and a slide pad 704 flexibly mounted within an opening 706 in frame 702. In one embodiment, frame 702 has linear inner sidewalls that form opening 706, which physically retrains the motion of slide pad 704 along the y-axis in the x and y plane. In one embodiment, frame 702 slide pad 704 and opening 706 are rectangular. In one embodiment, springs 708 attach slide pad 704 to frame 702 so that springs 708 return slide pad 704 to a center resting position within opening 706. In operation, a user scrolls up/down by moving slide pad 704 along the y-axis, and selects an option by pressing slide pad 704 into surface 604 along the z-axis.

Figure 8:
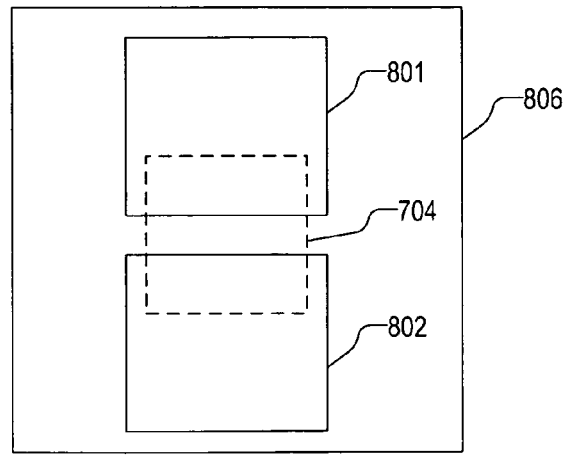
Figure 9:
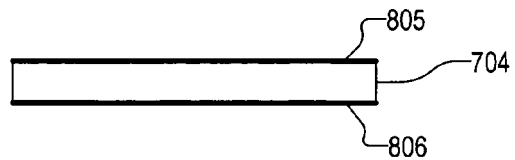
FIG. 9 illustrates a cross-sectional view of a slide pad in the second slide pad device in embodiments of the invention.

FIG. 8 illustrates a top view of components in device 700 located below slide pad 704 in one embodiment of the invention. These components include sense electrodes 801 and 802 on a printed circuit board 806. Slide pad 704 is shown in phantom over electrodes 801 and 802. FIG. 9 illustrates a cross-section of slide pad 704 in one embodiment of the invention. Slide pad 704 includes a top sense electrode 805 and a bottom reference electrode 806. Top sense electrode 805 is optional for some embodiments of the invention. Electrodes 801, 802, 805, and 806 include terminals connected to external circuitry to detect the capacitances between electrodes.

Figure 10:
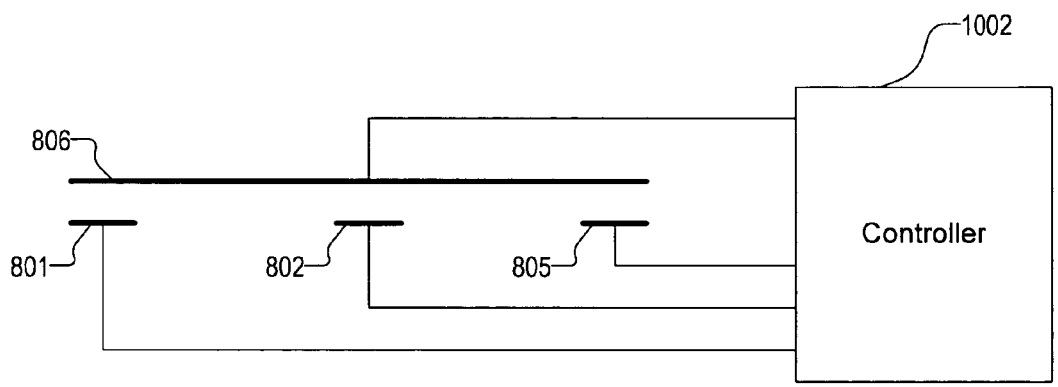
FIG. 10 illustrates a controller coupled to the sense electrodes of the second slide pad device in embodiments of the invention.

FIG. 10 illustrates a controller 1002 coupled to electrodes 801, 802, 805, and 806 to sense the capacitances between the sense electrode and the reference electrode. The capacitances can be correlated to the overlapped areas between slide pad 704 and electrodes 801 and 802, which in turn can be correlated to the displacement of slide pad 704 in the y-axis. The capacitances can also be correlated to the distance between electrodes 805 and 806, or the distance between electrode 806 and electrodes 801 and 802, which in turn can be correlated to the displacement of slide pad 704 in the z-axis. Note that the arrangement of electrodes 801, 802, 805, and 806 in FIG. 10 is not geometrically accurate and is shown to illustrate the operation of device 700.

In one embodiment of the invention, the displacement of slide pad 704 in the y-axis is determined using the following equations:

$$y \propto \frac{c1 - c2}{c1 + c2}, \qquad (5)$$

where y is the displacement along the y-axis, c1 is the capacitances between sense electrode 801 and reference electrode 806, and c2 is the capacitance between sense electrode 802 and reference electrode 806. Note that the denominator in equation (5) ensures the resulting displacement is independent of the gap between reference electrode 806 and sense electrodes 801 and 802.

In one embodiment of the invention, the displacement of slide pad 104 in the z-axis is determined using the following equation:

$$z \propto c5, \qquad (6)$$

where z is the displacement along the z-axis, and c5 is the capacitance between sense electrode 805 and reference electrode 806.

In another embodiment of the invention where sense electrode 805 is absent, the displacement of slide pad 104 in the z-axis is determined using the following equation:

$$z \propto c1 + c2. \qquad (7)$$

In one embodiment, controller 1002 measures capacitances c1, c2, and c5 individually and then uses the result to determine the displacements in the y and z-axes. In another embodiment, controller 1002 measures certain capacitances simultaneously. For example, the capacitance of (c1−c2) can be measured at reference electrode 806 by driving high sense electrode 801 and driving low sense electrode 802. Similarly, the capacitance of (c1+c2) can be measured at reference electrode 806 by driving sense electrodes 801 and 802 high.

Figure 11:
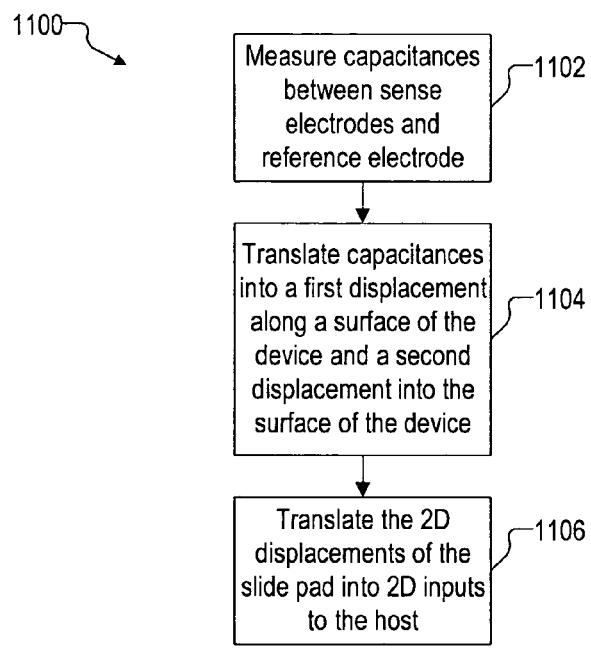
FIG. 11 illustrates a method for operating the second slide pad device in embodiments of the invention.

FIG. 11 is a flowchart 1100 for controller 1002 to determine the displacements of slide pad 704 in one embodiment of the invention.

In step 1102, controller 1002 determines the capacitances between the sense electrodes and the reference electrode necessary to determine the displacements of slide pad 704 in the y and z-axes. Controller 1002 may determine the necessary capacitances using any of the schemes described above.

In step 1104, controller 1002 translates the measured capacitances into y and z displacements using equations (5) and (6)/(7).

In step 1106, controller 1002 translates the y and z displacements into a one-dimensional input along the y-axis (e.g., scrolling up or down) parallel to surface 604, and a command along the z-axis into surface 604 (e.g., a selection command).

The y displacement can have a one-to-one correspondence with the displacement of a cursor. Alternatively, the y displacement can be scaled to generate the displacement of the cursor. Furthermore, the y displacements can be translated into a velocity for the cursor along the y-axis. Alternatively, any combination of the above three schemes can be used to provide one-dimensional input along the y-axis to host 600.

In one embodiment, controller 1002 starts to track the y displacement when the z displacement exceeds a first threshold. When the z displacement exceeds a second threshold, controller 1002 translates the z displacement into a select command. Controller 1002 provides these inputs to host 600.

In one embodiment of the invention, instead of using device 700 on surface 604 of host 600, device 100 is placed on surface 604 to perform the same function. In this embodiment, controller 402 only determines one-dimensional control along surface 604 (e.g., along the y-axis) even though it is perfectly capable of determining two-dimensional control along surface 604 (i.e., both x and y-axes).

Various other adaptations and combinations of features of the embodiments disclosed are within the scope of the invention. Although the various embodiments described above determine the displacement of the slide pad capacitively, the displacement of the slide pad can also be sensed magnetically or optically. Numerous embodiments are encompassed by the following claims.

What is claimed is:

1. A method for providing three-dimensional motion inputs to a device, comprising:
    measuring characteristics between a plurality of sense electrodes opposite a reference electrode on a movable pad;
    determining three-dimensional displacements of the movable pad from the characteristics;
    determining the three-dimensional motion inputs from the three-dimensional displacements of the movable pad; and
    providing the three-dimensional motion inputs to the device;
    wherein said measuring characteristics comprises measuring capacitances as follows:
    driving high a first sense electrode and a second sense electrode;
    driving low a third sense electrode and a fourth sense electrode; and
    measuring a capacitance at the reference electrode.

2. The method of claim 1, wherein the three-dimensional motion inputs comprise an up or down input, a left or right input, and an in or out input.

3. The method of claim 1, wherein the three-dimensional motion inputs comprise a pan up or down input, a pan left or right input, and a zoom in or out input.

4. The method of claim 1, wherein said measuring characteristics comprises measuring capacitances between (1) a first sense electrode and the reference electrode, (2) a second sense electrode and the reference electrode, (3) a third sense electrode and the reference electrode, and (4) a fourth sense electrode and the reference electrode.

5. The method of claim 1, wherein said determining the three-dimensional motion inputs from the three-dimensional displacements of the movable pad is selected from the group consisting of:
    (1) providing a one-to-one correspondence between the three-dimensional displacements and the three-dimensional motion inputs;
    (2) scaling the three-dimensional displacements into the three-dimensional motion inputs;
    (3) translating the three-dimensional displacements into velocities; and
    (4) a combination of (1), (2), and (3).

6. The method of claim 1, wherein said determining three-dimensional displacements of the movable pad from the characteristics comprises:

$$X \propto \frac{(C2 + C3) - (C1 + C4)}{(C1 + C2 + C3 + C4)},$$

-continued $$Y \propto \frac{(C1+C2)-(C3+C4)}{(C1+C2+C3+C4)},$$
$$Z \propto C1+C2+C3+C4,$$

where X, Y, and Z are the three-dimensional displacements, and C1, C2, C3, and C4 are capacitances between (1) a first, a second, a third, and a forth sense electrodes and (2) the reference electrode, respectively.

7. The method of claim 1, wherein said determining three-dimensional displacements of the movable pad from the characteristics comprises:

$$X \propto \frac{(C2+C3)-(C1+C4)}{(C1+C2+C3+C4)},$$
$$Y \propto \frac{(C1+C2)-(C3+C4)}{(C1+C2+C3+C4)},$$
$$Z \propto C5,$$

where X, Y, and Z are the three-dimensional displacements, and C1, C2, C3, C4, and C5 are capacitances between (1) a first, a second, a third, a forth, and a fifth sense electrodes and (2) the reference electrode, respectively.

8. The method of claim 1 wherein the movable pad is movable within an opening in a frame.

9. A pointing device mounted on a surface of a host device, comprising:
    a plurality of sense electrodes;
    a movable pad opposite the plurality of sense electrodes, the movable pad comprising a reference electrode; and
    a frame defining an opening, wherein the movable pad is flexibly mounted within the opening and the opening limiting motions of the movable pad on the surface along only one axis;
    springs coupling the movable pad to the frame; and
    a controller coupled to the plurality of sense electrodes and the reference electrode, the controller being configured to:
        measure characteristics between the plurality of sense electrodes opposite the reference electrode;
        determine three-dimensional displacements of the movable pad from the characteristics;
        determine the three-dimensional motion inputs from the three-dimensional displacements of the movable pad; and
    providing the three-dimensional motion inputs to the host device.

10. A method for providing three-dimensional motion inputs to a device, comprising:
    measuring characteristics between a plurality of sense electrodes opposite a reference electrode on a movable pad;
    determining three-dimensional displacements of the movable pad from the characteristics;
    determining the three-dimensional motion inputs from the three-dimensional displacements of the movable pad; and
    providing the three-dimensional motion inputs to the device;
    wherein said determining three-dimensional displacements of the movable pad from the characteristics comprises:

$$X \propto \frac{(C2+C3)-(C1+C4)}{(C1+C2+C3+C4)},$$
$$Y \propto \frac{(C1+C2)-(C3+C4)}{(C1+C2+C3+C4)},$$
$$Z \propto C1+C2+C3+C4,$$

where X, Y, and Z are the three-dimensional displacements, and C1, C2, C3, and C4 are capacitances between (1) a first, a second, a third, and a forth sense electrodes and (2) the reference electrode, respectively.

11. A method for providing three-dimensional motion inputs to a device, comprising:
    measuring characteristics between a plurality of sense electrodes opposite a reference electrode on a movable pad;
    determining three-dimensional displacements of the movable pad from the characteristics;
    determining the three-dimensional motion inputs from the three-dimensional displacements of the movable pad; and
    providing the three-dimensional motion inputs to the device;
    wherein said determining three-dimensional displacements of the movable pad from the characteristics comprises:

$$X \propto \frac{(C2+C3)-(C1+C4)}{(C1+C2+C3+C4)},$$
$$Y \propto \frac{(C1+C2)-(C3+C4)}{(C1+C2+C3+C4)},$$
$$Z \propto C5,$$

where X, Y, and Z are the three-dimensional displacements, and C1, C2, C3, C4, and C5 are capacitances between (1) a first, a second, a third, a forth, and a fifth sense electrodes and (2) the reference electrode, respectively.

* * * * *